J. S. BUSHNELL.
CALIPERS.
APPLICATION FILED FEB. 13, 1920.
1,393,746.
Patented Oct. 18, 1921.
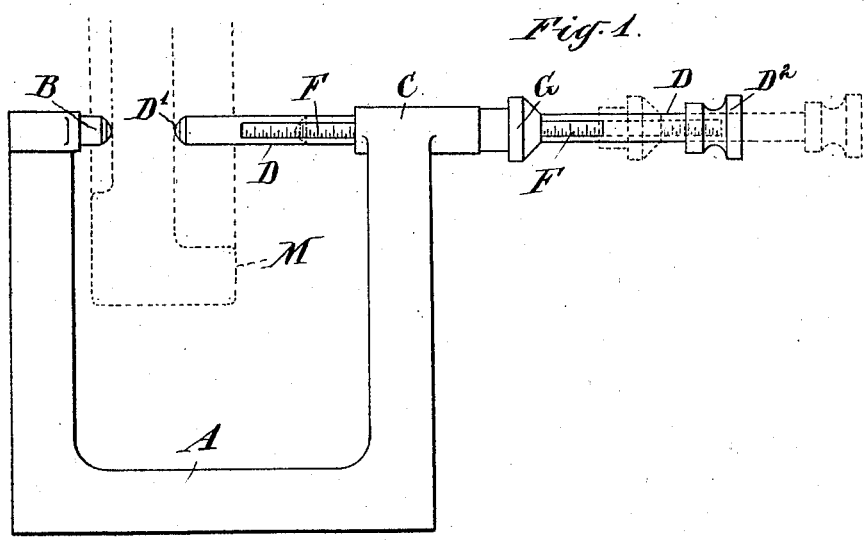
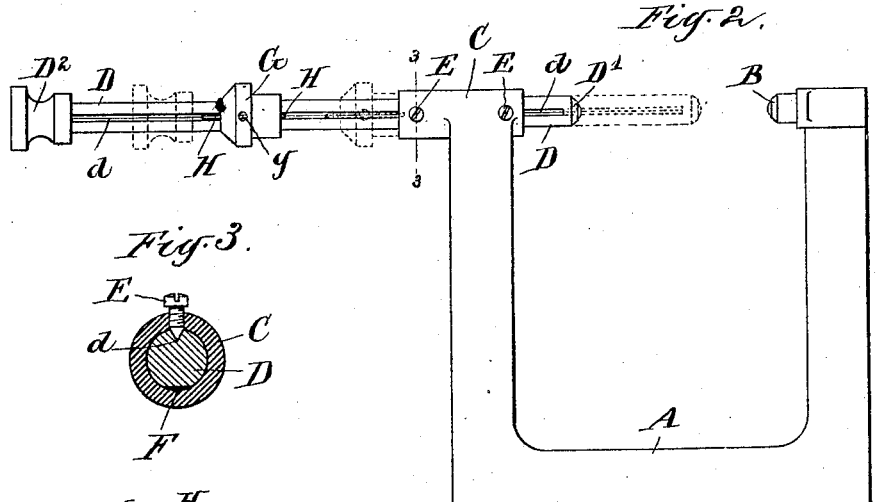
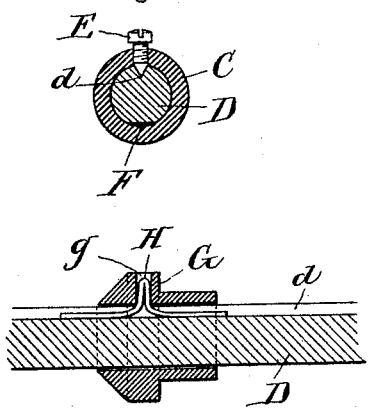
INVENTOR
John S. Bushnell,
BY Charles R. Searle,
ATTORNEY

UNITED STATES PATENT OFFICE.

JOHN S. BUSHNELL, OF NEW YORK, N. Y.

CALIPERS.

1,393,746.  Specification of Letters Patent.  Patented Oct. 18, 1921.

Application filed February 13, 1920. Serial No. 358,465.

*To all whom it may concern:*

Be it known that I, JOHN S. BUSHNELL, a citizen of the United States, residing in the city of New York, borough of Brooklyn, in the county and State of New York, have invented a certain new and useful Improvement in Calipers, of which the following is a specification.

The invention relates to measuring instruments of that class in which the object to be measured is received between two arms, one of which carries a movable member and the other a relatively fixed member.

The object of the invention is to provide an easily operated caliper of simple construction, by which diameters or thicknesses may be accurately measured in situations inaccessible to ordinary types of calipers, and the measurement thus made be recorded by and easily read on the instrument.

The invention consists in certain novel features of construction and arrangements of parts by which the above objects are attained, to be hereinafter described and claimed.

The accompanying drawings form a part of this application and show an approved form of the invention.

Figure 1 is an elevation of one face or front of the improved caliper. Fig. 2 is an elevation of the opposite or back face. Fig. 3 is a transverse section on a larger scale, taken on the line 3—3 in Fig. 2. Fig. 4 is a corresponding section taken longitudinally of the measuring rod and through the slide thereon.

Similar letters of reference indicate the same parts in all the figures.

A is a frame of general U-form having one arm equipped with an anvil or fixed abutment B, and the other with a housing or tubular guide C in which the measuring rod D is mounted to slide in alinement with the anvil B, and having an abutment or contact face $D^1$ serving with the anvil in making the required measurement of an object between them.

On the outer end of the measuring rod is a head $D^2$ by which it may be forced toward or from the anvil in making the measurement, in opposition to the friction induced by a pair of conically pointed screws E E mounted in the guide C and received in a V-groove $d$ on one side of the rod. The screws E also serve to hold the rod against rotation, and to limit its outward movement The rod is flattened on the face opposite the groove $d$ and the plane surface thus provided is divided by fine graduations from a zero point near the outer end of the rod toward the inner end, thus forming a scale F on which the measurement is read.

G is a cylindrical slide having a conical face at the outer end, inclosing the measuring rod between the guide C and head $D^2$ and free to slide on the rod but subject to the yielding resistance of a suitable friction device, shown as a light V-shaped wire spring H having its fold or bight received in a radial recess $g$ in the slide and its oppositely disposed legs received in the groove $d$ and adapted to induce the desired frictional engagement with the rod.

It is frequently necessary in shop practice to make measurements in situations difficult of access or poorly lighted, in which the use of ordinary calipers is impracticable, and also to measure a part surrounded by a flange or like obstruction, as indicated in Fig. 1 at M. The improved caliper is intended to facilitate such work and operates as follows:—The rod D is withdrawn as far as permitted by the screws E and groove $d$, or sufficiently to permit the application of the instrument to the part to be measured. The anvil B is brought into contact with one face of such part and the rod D thrust inwardly until in contact with the opposite face. By this movement the slide G is forced closely against the outer end of the guide C and the measurement thus made. The rod D with the slide G still in the same relative position thereon is then withdrawn to permit the disengagement of the instrument, which may then be taken to the light and the measurement read on the scale F. The latter is so graduated that when the anvil and contact face $D^1$ abut together and the slide G is firmly in contact with the guide, the conical reading edge of the slide will exactly coincide with the zero mark on the scale, consequently the distance between the anvil and rod in making a measurement is indicated by the position of the reading edge on the scale. It is important in making the measurement that the slide be in close contact with the outer end of the guide when both contact points are in touch with the surfaces of the piece to be measured. It will be noted that the rod may be moved outwardly to release the instrument, without changing the position of the slide upon the rod.

Modifications may be made in the forms and proportions of the parts in adapting the invention to various uses, and the types of contact points on the rod and anvil may be varied as preferred.

Other friction devices than those shown may be employed to hold the rod yieldingly in its guide, or to maintain the slide G movably in place on the rod.

I claim:—

1. In a device of the character set forth, a frame having two arms, an anvil on one arm, a tubular guide on the other arm, a measuring rod non-rotatable but endwise movable in said guide for coöperation with said anvil, frictional means coöperating with said rod, a slide on said rod, and a friction device held in said slide with oppositely extended ends frictionally engaging said rod.

2. In a device of the character set forth, a frame having two arms, an anvil on one arm, a tubular guide on the other arm, a measuring rod non-rotatable but endwise movable in said guide for coöperation with said anvil, frictional means coöperating with said rod, a slide on said rod, and a friction device held in said slide with oppositely extended ends frictionally engaging said rod, said rod having a longitudinal groove receiving said friction means and said ends of said friction device.

3. In a device of the character set forth, a frame having two arms, an anvil on one of said arms, a guide on the other of said arms, a rod slidably mounted in said guide in alinement with said anvil and having a scale, frictional means for yieldingly holding said rod in position in said guide and against rotation therein, a slide movable axially on said rod, and resilient frictional means within said slide for yieldingly holding said slide in position on said rod.

4. In a device of the character set forth, a frame having two arms, an anvil on one of said arms, a tubular guide on the other of said arms, a rod slidably mounted in said guide in alinement with said anvil and having a longitudinally extending groove in one side, resilient means carried within said guide and extending into said groove in frictional engagement with said rod, and a slide movable axially on said rod.

5. In a device of the character set forth, a frame having two arms, an anvil on one of said arms, a tubular guide on the other of said arms, a rod slidably mounted in said guide in alinement with said anvil and having a longitudinally extending groove in one side, means carried by said guide and extending into said groove in frictional engagement with said rod, a slide movable axially on said rod, and a spring carried by said slide and extending into said groove in frictional engagement with said rod.

6. In a device of the character set forth, a frame having two arms, an anvil on one of said arms, a tubular guide on the other of said arms, a rod having a scale and slidably mounted in said guide in alinement with said anvil and having a longitudinally extending groove in one side, a screw in said guide extending into said groove, a slide movable axially on said rod, and a spring carried by said slide, extending into said groove and in frictional engagement with said rod.

In testimony that I claim the invention above set forth I affix my signature.

JOHN S. BUSHNELL.